(12) United States Patent
Waddell

(10) Patent No.: US 12,015,250 B2
(45) Date of Patent: Jun. 18, 2024

(54) SELF-CLEANING ION GENERATOR DEVICE

(71) Applicant: Global Plasma Solutions, Inc., Charlotte, NC (US)

(72) Inventor: Charles Houston Waddell, Roanoke, VA (US)

(73) Assignee: Global Plasma Solutions, Inc., Charlotte, NC (US)

( * ) Notice: Subject to any disclaimer, the term of this patent is extended or adjusted under 35 U.S.C. 154(b) by 0 days.

(21) Appl. No.: 18/447,408

(22) Filed: Aug. 10, 2023

(65) Prior Publication Data

US 2023/0387668 A1 Nov. 30, 2023

Related U.S. Application Data

(63) Continuation of application No. 18/096,327, filed on Jan. 12, 2023, and a continuation of application No.
(Continued)

(51) Int. Cl.
*H01T 23/00* (2006.01)
*B01D 53/32* (2006.01)
(Continued)

(52) U.S. Cl.
CPC ............. *H01T 23/00* (2013.01); *B01D 53/32* (2013.01); *B03C 3/41* (2013.01); *B03C 3/743* (2013.01); *B03C 3/82* (2013.01); *B08B 1/32* (2024.01); *F24F 8/30* (2021.01); *B01D 2259/4508* (2013.01); *B01D 2259/818* (2013.01)

(58) Field of Classification Search
CPC ... H01T 23/00; F24F 8/30; B08B 1/32; B01D 2259/4508; B01D 2259/818
See application file for complete search history.

(56) References Cited

U.S. PATENT DOCUMENTS

| | | | |
|---|---|---|---|
| 1,811,687 | A | 6/1931 | Philip et al. |
| 3,624,448 | A | 11/1971 | Saurenman et al. |

(Continued)

FOREIGN PATENT DOCUMENTS

| | | |
|---|---|---|
| AU | 2014214642 A1 | 8/2015 |
| CA | 2108790 A1 | 4/1995 |

(Continued)

OTHER PUBLICATIONS

Airmaid by Interzon product brochure; Sep. 2016; Interzon AB, Propellervagen 4A,SE-183 62 Taby, Sweden www.airmaid.com. 2 pages.

(Continued)

*Primary Examiner* — Anne M Hines
(74) *Attorney, Agent, or Firm* — Seth L. Hudson; Maynard Nexsen PC

(57) ABSTRACT

A self-cleaning ion generator device includes a housing having a bottom portion and a top portion selectively secured to each other, the top portion contains a base portion extending to an outer edge and having an internal side and an external side, a first pair of opposed sidewalls and a second pair of opposed sidewalls extend from the outer edge of the base portion forming a cavity therein. Ion terminals extend from the housing, and a cleaning apparatus for cleaning the two ion terminals.

20 Claims, 7 Drawing Sheets

Related U.S. Application Data

16/434,591, filed on Jun. 7, 2019, now Pat. No. 11,581,709.

(51) Int. Cl.
| | | |
|---|---|---|
| *B03C 3/41* | (2006.01) | |
| *B03C 3/74* | (2006.01) | |
| *B03C 3/82* | (2006.01) | |
| *B08B 1/32* | (2024.01) | |
| *F24F 8/30* | (2021.01) | |

(56) References Cited

U.S. PATENT DOCUMENTS

| | | | |
|---|---|---|---|
| 3,652,897 | A | 3/1972 | Iosue et al. |
| 3,769,695 | A | 11/1973 | Price et al. |
| 3,968,405 | A | 7/1976 | Testone |
| 4,031,599 | A | 6/1977 | Testone |
| 4,117,326 | A | 9/1978 | Askman |
| D253,281 | S | 10/1979 | Kim |
| 4,216,518 | A | 8/1980 | Simons |
| 4,263,636 | A | 4/1981 | Testone |
| 4,264,343 | A | 4/1981 | Nat Arajan et al. |
| 4,284,420 | A | 8/1981 | Borysiak |
| D286,765 | S | 11/1986 | Prouty et al. |
| 4,734,580 | A | 3/1988 | Rodrigo et al. |
| 4,757,422 | A | 7/1988 | Bossard et al. |
| 4,809,127 | A | 2/1989 | Steinman et al. |
| 4,829,398 | A | 5/1989 | Wilson |
| 5,034,651 | A | 7/1991 | Domschat |
| 5,084,077 | A | 1/1992 | Junker et al. |
| D332,942 | S | 2/1993 | Julien |
| D353,575 | S | 12/1994 | Macomber |
| 5,464,754 | A | 11/1995 | Dennis et al. |
| 5,492,557 | A | 2/1996 | Vanella |
| 5,653,638 | A | 8/1997 | Nagata |
| 5,737,176 | A | 4/1998 | Muz |
| 5,741,352 | A | 4/1998 | Ford et al. |
| 5,768,087 | A | 6/1998 | Vernitskiy |
| 5,879,435 | A | 3/1999 | Satyapal et al. |
| 5,931,989 | A | 8/1999 | Knutsson |
| 6,019,815 | A | 2/2000 | Satyapal et al. |
| 6,118,645 | A | 9/2000 | Partridge |
| D434,523 | S | 11/2000 | Ford |
| 6,156,099 | A | 12/2000 | Hironaka et al. |
| D443,587 | S | 6/2001 | Sakasegawa |
| 6,252,756 | B1 | 6/2001 | Richie, Jr. et al. |
| 6,330,146 | B1 | 12/2001 | Blitshteyn et al. |
| 6,350,417 | B1 | 2/2002 | Lau et al. |
| 6,417,581 | B2 | 7/2002 | Hall et al. |
| 6,464,754 | B1 | 10/2002 | Ford |
| 6,544,485 | B1 | 4/2003 | Taylor |
| D476,298 | S | 6/2003 | Lee |
| 6,576,046 | B2 | 6/2003 | Pruette et al. |
| 6,653,638 | B2 | 11/2003 | Fujii |
| 6,680,033 | B2 | 1/2004 | Ishii |
| 6,744,611 | B2 | 6/2004 | Yang et al. |
| 6,791,814 | B2 | 9/2004 | Adachi et al. |
| 6,850,403 | B1 | 2/2005 | Gefter et al. |
| 6,855,190 | B1 | 2/2005 | Nikkhah |
| 6,902,392 | B2 | 6/2005 | Johnson |
| D533,832 | S | 12/2006 | Hock |
| 7,177,133 | B2 | 2/2007 | Riskin |
| 7,244,289 | B2 | 7/2007 | Su |
| 7,256,979 | B2 | 8/2007 | Sekoguchi et al. |
| 7,273,515 | B2 | 9/2007 | Yuen |
| 7,408,759 | B2 | 8/2008 | Gefter et al. |
| D587,198 | S | 2/2009 | Nagasawa |
| 7,492,568 | B2 | 2/2009 | Takayanagi |
| 7,497,898 | B2 | 3/2009 | Sato et al. |
| 7,639,472 | B2 | 12/2009 | Sekoguchi et al. |
| 7,716,772 | B2 | 5/2010 | Shih et al. |
| 7,739,771 | B2 | 6/2010 | Powell, Jr. |
| 7,764,482 | B2 | 7/2010 | Lee et al. |
| 7,824,477 | B2 | 11/2010 | Kang et al. |
| 7,916,445 | B2 | 3/2011 | Sekoguchi et al. |
| 7,940,509 | B2 | 5/2011 | Orihara et al. |
| 7,948,733 | B2 | 5/2011 | Hashimoto |
| 7,961,451 | B2 | 6/2011 | Sekoguchi et al. |
| 7,969,707 | B2 | 6/2011 | Riskin |
| 7,995,321 | B2 | 8/2011 | Shimada |
| 8,043,573 | B2 | 10/2011 | Parker et al. |
| 8,053,741 | B2 | 11/2011 | Sekoguchi |
| 8,106,367 | B2 | 1/2012 | Riskin |
| 8,134,821 | B2 | 3/2012 | Fukai et al. |
| 8,328,902 | B2 | 12/2012 | Boyden et al. |
| 8,351,168 | B2 | 1/2013 | Sicard |
| 8,425,658 | B2 | 4/2013 | Lee |
| 8,554,924 | B2 | 10/2013 | Holden et al. |
| 8,564,924 | B1 | 10/2013 | Waddell et al. |
| 8,710,455 | B2 | 4/2014 | Shiozawa |
| 8,710,456 | B2 | 4/2014 | Klochkov et al. |
| 8,724,286 | B2 | 5/2014 | Uchida et al. |
| 8,861,168 | B2 | 10/2014 | Waddell et al. |
| 8,951,024 | B2 | 2/2015 | Ishii et al. |
| 8,957,571 | B2 | 2/2015 | Riskin |
| 9,293,895 | B2 | 3/2016 | Pucciani et al. |
| D754,314 | S | 4/2016 | Ellis et al. |
| 9,579,664 | B2 | 2/2017 | Marra |
| 9,623,422 | B2 | 4/2017 | Overdahl |
| 9,630,185 | B1 | 4/2017 | Riskin |
| 9,630,186 | B2 | 4/2017 | Back |
| 9,646,806 | B2 | 5/2017 | Jang et al. |
| 9,660,425 | B1 | 5/2017 | Sunshine |
| 9,661,725 | B2 | 5/2017 | Gefter |
| 9,661,727 | B2 | 5/2017 | Gefter |
| 9,849,208 | B2 | 12/2017 | Waddell |
| 9,859,090 | B2 | 1/2018 | Gefter |
| 9,948,071 | B2 | 4/2018 | Chen et al. |
| 9,985,421 | B2 | 5/2018 | Sunshine |
| 10,020,180 | B2 | 7/2018 | Waddell |
| 10,116,124 | B2 | 10/2018 | Sung et al. |
| 10,153,623 | B2 | 12/2018 | Sunshine |
| 10,258,922 | B2 | 4/2019 | Hsieh |
| D848,945 | S | 5/2019 | Lin |
| 10,297,984 | B2 | 5/2019 | Sunshine |
| 10,322,205 | B2 | 6/2019 | Waddell |
| 10,439,370 | B2 | 10/2019 | Sunshine |
| 10,492,285 | B2 | 11/2019 | Lee et al. |
| 10,566,769 | B2 | 2/2020 | Waddell |
| 10,695,455 | B2 | 6/2020 | Waddell |
| 10,710,098 | B2 | 7/2020 | Marra |
| 10,737,279 | B2 | 8/2020 | Gefter et al. |
| 10,758,947 | B2 | 9/2020 | Heymann et al. |
| 10,786,818 | B2 | 9/2020 | Galbreath et al. |
| 10,980,911 | B2 | 4/2021 | Waddell |
| 11,283,245 | B2 | 3/2022 | Waddell |
| 11,581,709 | B2 | 2/2023 | Waddell |
| 11,764,549 | B2 | 9/2023 | Waddell |
| 2003/0072697 | A1 | 4/2003 | Taylor |
| 2003/0147783 | A1 | 8/2003 | Taylor |
| 2006/0193100 | A1 | 8/2006 | Izaki et al. |
| 2007/0253860 | A1 | 11/2007 | Schroder |
| 2008/0130190 | A1 | 6/2008 | Shimada |
| 2008/0160904 | A1 | 7/2008 | Yi et al. |
| 2009/0052108 | A1 | 2/2009 | Innami et al. |
| 2009/0211459 | A1 | 8/2009 | Hu et al. |
| 2010/0157503 | A1 | 6/2010 | Saito et al. |
| 2010/0172808 | A1 | 7/2010 | Igarashi |
| 2010/0175391 | A1 | 7/2010 | Jee et al. |
| 2012/0068082 | A1 | 3/2012 | Noda |
| 2012/0154973 | A1 | 6/2012 | Vaynerman et al. |
| 2013/0214173 | A1 | 8/2013 | Noda et al. |
| 2014/0076162 | A1 | 3/2014 | Waddell et al. |
| 2014/0078639 | A1 | 3/2014 | Waddell et al. |
| 2014/0103793 | A1 | 4/2014 | Nishida et al. |
| 2014/0147333 | A1 | 5/2014 | Morfill |
| 2014/0233232 | A1 | 8/2014 | Radermacher |
| 2015/0255961 | A1 | 9/2015 | Chen et al. |
| 2016/0167059 | A1 | 6/2016 | Waddell |
| 2016/0175852 | A1 | 6/2016 | Waddell |
| 2017/0040149 | A1* | 2/2017 | Waddell ............ H01J 37/32862 |
| 2017/0232131 | A1 | 8/2017 | Waddell |
| 2017/0274113 | A1 | 9/2017 | Takasahara et al. |
| 2018/0040466 | A1 | 2/2018 | Waddell |

(56) References Cited

U.S. PATENT DOCUMENTS

| | | | |
|---|---|---|---|
| 2018/0071426 | A1 | 3/2018 | Waddell |
| 2018/0169711 | A1 | 6/2018 | Waddell |
| 2019/0353359 | A1 | 11/2019 | Seibold |
| 2020/0161839 | A1 | 5/2020 | Waddell |
| 2022/0094142 | A1 | 3/2022 | Waddell |

FOREIGN PATENT DOCUMENTS

| | | | |
|---|---|---|---|
| CN | 107138028 | A | 9/2017 |
| CN | 111228535 | A | 6/2020 |
| DE | 3735219 | A1 | 4/1989 |
| DE | 10355834 | A1 | 7/2005 |
| DE | 202006006549 | U1 | 8/2007 |
| DE | 102009035066 | A1 | 3/2010 |
| DE | 102008062415 | A1 | 7/2010 |
| DE | 202020102021 | U1 | 4/2020 |
| EP | 0919287 | A2 | 6/1999 |
| EP | 1878509 | A2 | 1/2008 |
| EP | 2336665 | A1 | 6/2011 |
| EP | 2411058 | A1 | 2/2012 |
| EP | 2683042 | A2 | 1/2014 |
| EP | 2905036 | A1 | 8/2015 |
| EP | 3093564 | A1 | 11/2016 |
| EP | 3165833 | A1 | 5/2017 |
| EP | 3346560 | A1 | 7/2018 |
| FR | 1494344 | A | 9/1967 |
| GB | 1356211 | A | 6/1974 |
| GB | 2117676 | A | 10/1983 |
| GB | 2117676 | A1 | 10/1983 |
| GB | 2245200 | A | 1/1992 |
| GB | 2301179 | A | 11/1996 |
| GB | 2377660 | A | 1/2003 |
| GB | 2415774 | A | 1/2006 |
| GB | 2529173 | A | 2/2016 |
| ID | D00000059390001 | | 4/2004 |
| JP | 2681623 | B2 | 11/1997 |
| JP | 2002043092 | A | 2/2002 |
| JP | 2004006152 | A | 1/2004 |
| JP | 2007141692 | A | 6/2007 |
| JP | 2009043580 | A | 2/2009 |
| JP | 4778289 | B2 | 9/2011 |
| JP | 5094492 | B2 | 12/2012 |
| JP | 2017098139 | A | 6/2017 |
| KR | 100776572 | B1 | 11/2007 |
| KR | 101589055 | B1 | 1/2016 |
| KR | 20160138931 | A | 12/2016 |
| KR | 101800326 | B1 | 12/2017 |
| KR | 101816255 | B1 | 1/2018 |
| WO | 8700089 | A1 | 1/1987 |
| WO | 9820588 | A1 | 5/1998 |
| WO | 2006039147 | A2 | 4/2006 |
| WO | 2007009336 | A1 | 1/2007 |
| WO | 2007131981 | A1 | 11/2007 |
| WO | 2010014654 | A1 | 2/2010 |
| WO | 2010074654 | A1 | 7/2010 |
| WO | 2010140434 | A1 | 12/2010 |
| WO | 2011136735 | A1 | 11/2011 |
| WO | 2012176099 | A1 | 12/2012 |
| WO | 2013173528 | A1 | 11/2013 |
| WO | 2014047445 | A1 | 3/2014 |
| WO | 2015052557 | A1 | 4/2015 |
| WO | 2015101348 | A1 | 7/2015 |
| WO | 2015111853 | A1 | 7/2015 |
| WO | 2015138802 | A1 | 9/2015 |
| WO | 2016000411 | A1 | 1/2016 |
| WO | 2016082730 | A1 | 6/2016 |
| WO | 2016134204 | A1 | 8/2016 |
| WO | 2016147127 | A1 | 9/2016 |
| WO | 2016204688 | A1 | 12/2016 |
| WO | 2017022255 | A1 | 2/2017 |
| WO | 2017067341 | A1 | 4/2017 |
| WO | 2017085954 | A1 | 5/2017 |
| WO | 2017152693 | A1 | 9/2017 |
| WO | 2017155458 | A1 | 9/2017 |
| WO | 2017168800 | A1 | 10/2017 |
| WO | 2018175828 | A1 | 9/2018 |
| WO | 2018189924 | A1 | 10/2018 |
| WO | 2018234633 | A1 | 12/2018 |
| WO | 2019000694 | A1 | 1/2019 |
| WO | 2019108898 | A1 | 6/2019 |
| WO | 2020037851 | A1 | 2/2020 |
| WO | 2020056855 | A1 | 3/2020 |
| WO | 2020078284 | A1 | 4/2020 |
| WO | 2020158967 | A1 | 8/2020 |
| WO | 2020186576 | A1 | 9/2020 |
| WO | 2020218247 | A1 | 10/2020 |

OTHER PUBLICATIONS

Extended European Search Report dated Sep. 28, 2021, in European Application No. 19750315.4, 60 pages.
Global Plasma Solutions. Link: https://gpshvac.com/wpcontent/uploads/2017/07/GPS-FC48-AC-IOM-Rev-.pdf Visited Jul. 5, 2019. GPS-FC48-AC-IOM-Rev Self-Cleaning Ion Generator Device. (Year: 2019) 2 pages.
Products Web Page, http://www.gpshvac.com/index.php?option=com_content&view=article&id=11&itemid=93, 1 1 page, Apr. 29, 2013, retrieved from Internet Archive Wayback Machine, hllps://web.archive.org/web/20130429232411 http:/lwww.gpshvac.com/index.php?option=com_content&view=article&id=11&1temid=93 on Jan. 20, 2017.
RGF Environmental Air Purification Technologies—Guardian Air HVAC Cell Web Page, http://www.airstarsolutions.com/Pages/RGFguardian.aspx,3 pages, Aug. 20, 2012, retrieved from Internet Archive Wayback Machine, https:// , web.archive.org/web/20120820000149/http://www.airstarsolutions.com/Pages/RGFguardian.aspx on Jan. 20, 2011.
Pushpawala Buddhi, et al., "Efficiency of Ionizers in Removing Airborne Particles in Indoor Environments." Journal of Electrostatics, vol. 90, pp. 79-84, Dec. 2017.
Wang, Wei, et al., "Assessment of Indoor Air Quality Using Different Air-Condition for Cooling." Advanced Materials Research, vol. 518-523, pp. 910-913, May 2012.
Wang, Yun Han, et al., "Research Progress of Air Purifier Principles and Material Technologies." Advanced Materials Research, vol. 1092-1093, pp. 1025-1028, Mar. 2015.
K. Nishikawa and H. Nojima, "Air purification technology by means of cluster ions generated by discharge plasma at atmospheric pressure." The 3oth International Conference on Plasma Science, 2003. ICOPS 2003. IEEE Conference Record—Abstracts, pp. 379-, 2003.

* cited by examiner

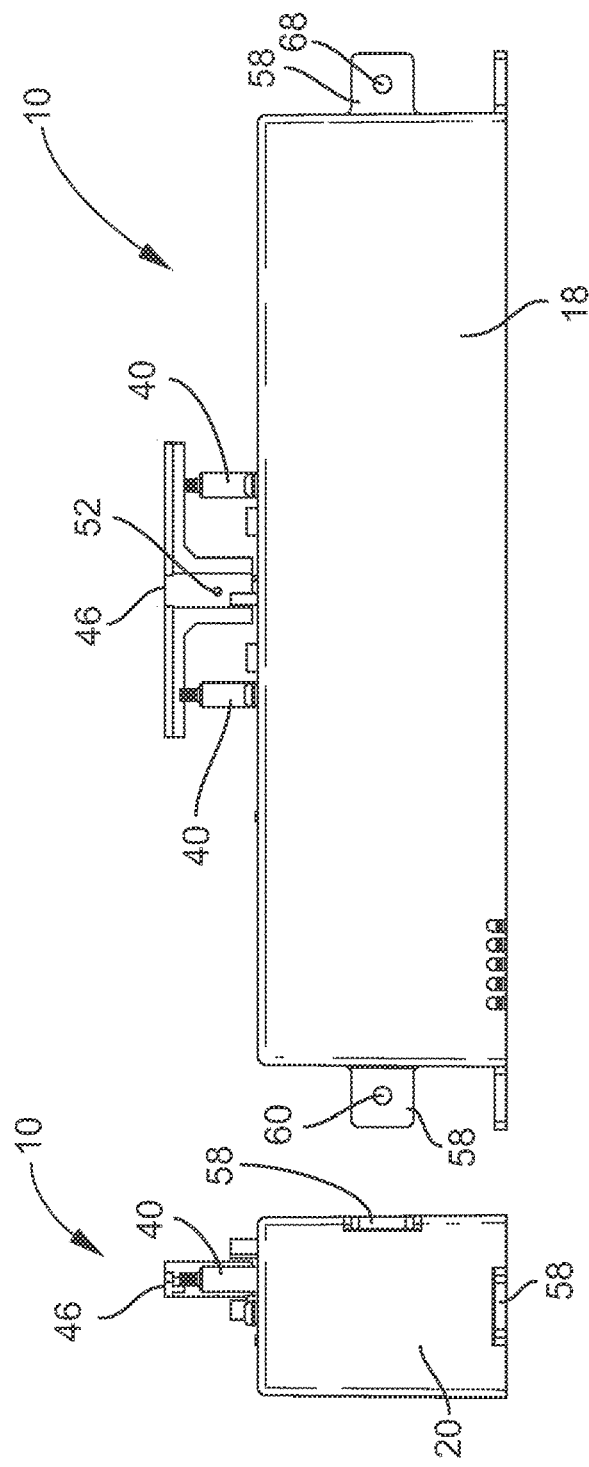

SELF-CLEANING ION GENERATOR DEVICE

CROSS REFERENCE TO RELATED PATENT APPLICATION

The present patent application/patent is a continuation of U.S. patent application Ser. No. 18/096,327 filed on Jan. 12, 2023 titled "SELF-CLEANING ION GENERATOR DEVICE", which is a continuation of U.S. Pat. No. 11,581,709 filed Jun. 7, 2019 titled "SELF-CLEANING ION GENERATOR DEVICE", the contents of which are incorporated in full by reference herein.

FIELD OF THE INVENTION

The present invention relates generally to the field of air treatment, and more particularly to the treatment of air using ionization that has a self-cleaning mechanism for cleaning the electrodes of an ionization device without having to remove the device from the conduit or duct.

BACKGROUND OF THE INVENTION

Air and other fluids are commonly treated and delivered for a variety of applications. For example, in heating, ventilation and air-conditioning (HVAC) applications, air may be heated, cooled, humidified, dehumidified, filtered or otherwise treated for delivery into residential, commercial or other spaces.

Needs exist for improved systems and methods of treating and delivering air for these and other applications. It is to the provision of improved systems and methods meeting these needs that the present invention is primarily directed.

BRIEF SUMMARY OF THE INVENTION

According to an embodiment of the present invention a self-cleaning ion generator device includes a rectangular housing having a bottom portion and a top portion selectively secured to each other, the top portion contains a base portion extending to an outer edge and having an internal side and an external side. A first pair of opposed sidewalls and a second pair of opposed sidewalls extend from the outer edge of the base portion forming a cavity therein. At least one ion terminal extends from the housing and a cleaning apparatus for cleaning the at least one ion terminal.

According to another embodiment of the present invention, the self-cleaning ion generator device includes a rib for cleaning the at least one ion terminal.

According to yet another embodiment of the present invention, the self-cleaning ion generator device includes a cleaning apparatus powered by a motor for rotation during periodic intervals.

According to yet another embodiment of the present invention, the self-cleaning ion generator device includes an ion generator coupled to the at least one ion terminal.

According to yet another embodiment of the present invention, the self-cleaning ion generator device includes an ion terminal consisting of a hollow column encircling a high voltage wire.

According to yet another embodiment of the present invention, the self-cleaning ion generator device includes a high voltage wire with a brush engaged thereto with a plurality of bristles composed of material that conducts electricity.

According to yet another embodiment of the present invention, the self-cleaning ion generator device includes at least two ion terminals spaced apart and extending from the housing.

According to yet another embodiment of the present invention, the self-cleaning ion generator device that includes at least one bore disposed on the top portion for receiving an ion terminal having a first portion and a second portion, wherein the second portion of the ion terminal extends into the cavity and the first portion of the ion terminal extends above the housing.

According to yet another embodiment of the present invention, the self-cleaning ion generator device includes a cleaning apparatus having a horizontal portion and a vertical portion forming a t-shape.

According to yet another embodiment of the present invention, the self-cleaning ion generator device includes ion terminals that emit either positive or negative ions or positive and negative ions.

According to yet another embodiment of the present invention, the self-cleaning ion generator device includes a rectangular housing having a bottom portion and a top portion selectively secured to each other. The top portion contains a base portion extending to an outer edge and having an internal side and an external side. A first pair of opposed sidewalls and a second pair of opposed sidewalls extend from the outer edge of the base portion forming a cavity therein. At least two ion terminals extend from the housing, and a cleaning apparatus for cleaning the two ion terminals.

According to yet another embodiment of the present invention, the self-cleaning ion generator device includes an ion generator housed within the cavity and coupled to the at least two ion terminals.

According to yet another embodiment of the present invention, the self-cleaning ion generator device includes a motor housed within the housing and a rotational arm is engaged to the motor. The cleaning apparatus is engaged to the rotational arm.

According to yet another embodiment of the present invention, the self-cleaning ion generator device includes a vertical and a horizontal fastening device.

According to yet another embodiment of the present invention, the self-cleaning ion generator device includes a rectangular housing having a bottom portion and a top portion selectively secured to each other, the top portion contains a base portion extending to an outer edge and having an internal side and an external side. A first pair of opposed sidewalls and a second pair of opposed sidewalls extend from the outer edge of the base portion forming a cavity therein. The device includes at least one ion terminal assembly comprised of an ion terminal, an ion terminal securing device, and an attachment device. The device further includes at least one bore within the top portion for receiving the ion terminal therein, and a cleaning apparatus for cleaning the at least one ion terminal.

According to yet another embodiment of the present invention, the self-cleaning ion generator device includes a depression on the top portion for receiving the ion terminal securing device.

According to yet another embodiment of the present invention, the self-cleaning ion generator device includes a rib disposed n the cleaning apparatus for cleaning the at least one ion terminal.

BRIEF DESCRIPTION OF THE DRAWINGS

The present invention is illustrated and described herein with reference to the various drawings, in which like reference numbers denote like method steps and/or system components, respectively, and in which:

FIG. 3 is a side view of the self-cleaning ion generator device;

FIG. 4 is a front view of the self-cleaning ion generator device;

FIG. 5 is a side view of the self-cleaning ion generator device;

DETAILED DESCRIPTION OF THE INVENTION

Figure 1:
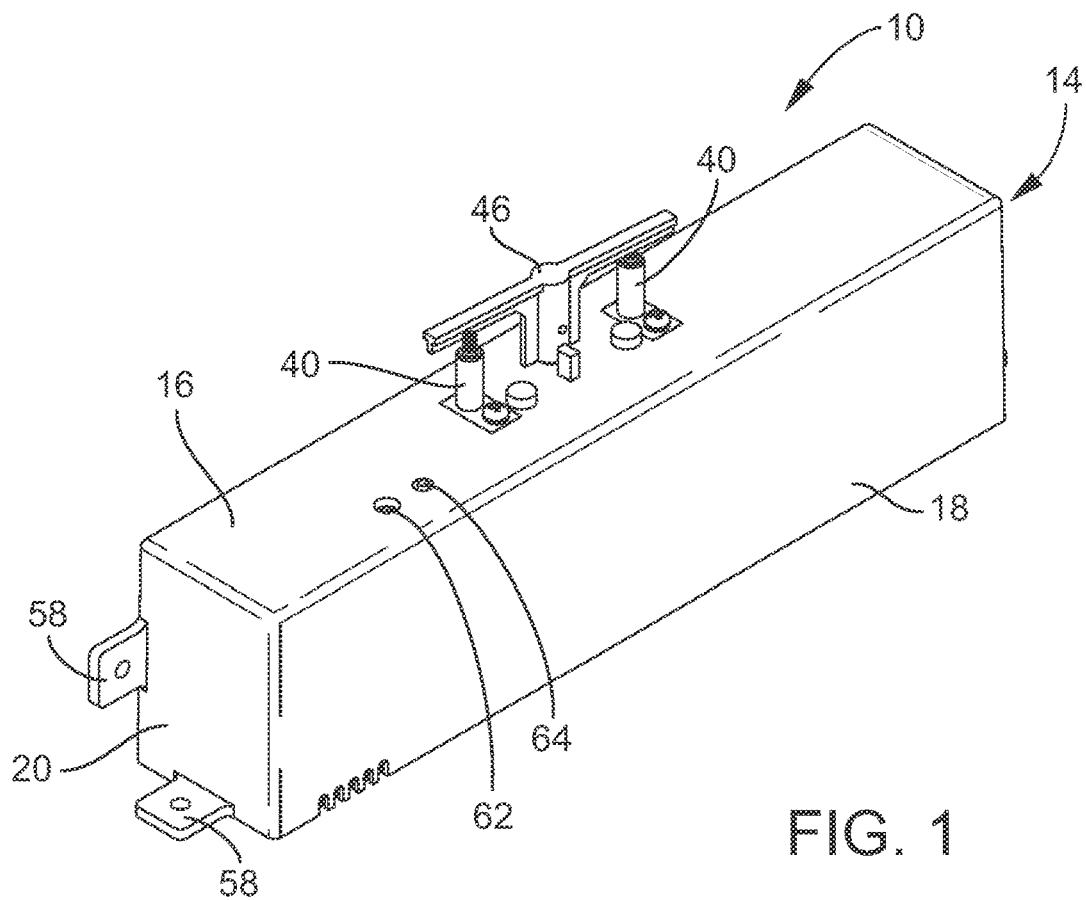
FIG. 1 is a top perspective view of the self-cleaning ion generator device.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring now specifically to the drawings, a self-cleaning ion generator device is illustrated in FIGS. 1-14 and is shown generally at reference numeral 10. The device 10 includes a housing having a bottom portion 12 and a top portion 14. The bottom portion 12 is rectangular with a first side and a second side. The top portion 14 contains a base portion 16 extending to an outer edge and having an internal side and an external side. A first pair of opposed sidewalls 18 and a second pair of opposed sidewalls 20 extend upward from the outer edge of the base portion 16. The first pair of opposed sidewalls 18 and the second pair of opposed sidewalls 20 intersect and the intersection is defined as a corner. The first pair of opposed sidewalls 18 and a second pair of opposed sidewalls 20 extend upward and to an upper edge 22. The top portion 14 is rectangularly shaped with the first pair of opposed sidewalls 18 having a longer length than the second pair of opposed sidewalls 20. A cavity 24 is formed within the base portion 16, the first pair of opposed sidewalls 18, and the second pair of opposed sidewalls 20.

The top portion 14 and the bottom portion 12 are selectively secured to each other. When selectively secured, the upper edge 22 of the top portion 14 contacts the first side of the bottom portion 12. At least one attachment device 26 selectively secures the top portion 14 to the bottom portion 12.

A circuit board 28, a stepper motor 30, and an ion generator 32 are disposed within the cavity 24, as shown in FIGS. 9-14. The circuit board 28 may include a power supply source for providing power to the device 10. The circuit board 28 is communicatively coupled to the ion generator 32 to produce ions and the stepper motor 30. The power supply provides the electricity to power the ion generator 32, and thus, produce ions. Additionally, the circuitry also includes a timing circuit for timing the stepper motor 30 that engages or is activated at a predetermined time.

Figure 9:
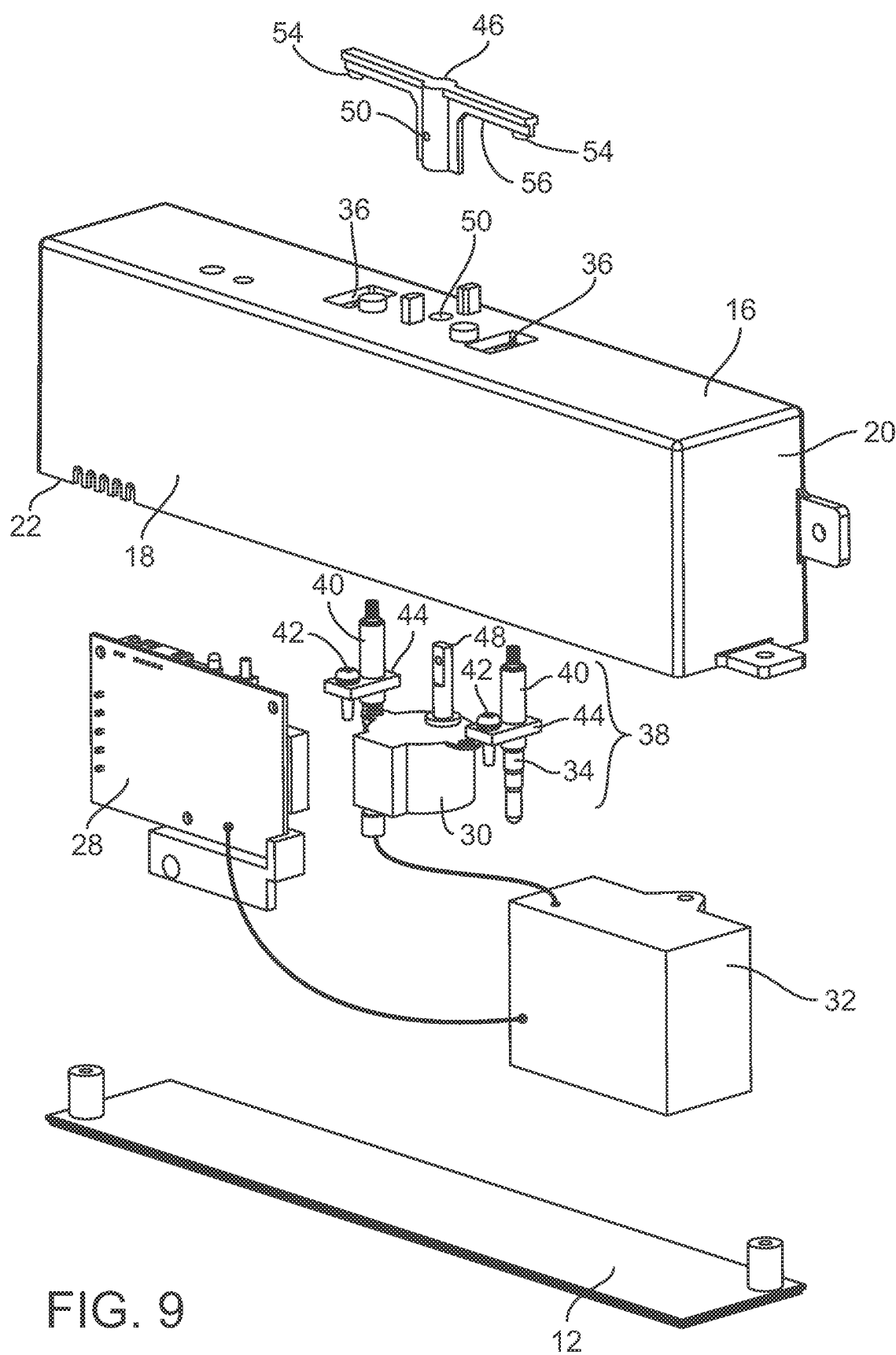
FIG. 9 is an exploded view of the self-cleaning ion generator device.
Figure 10:
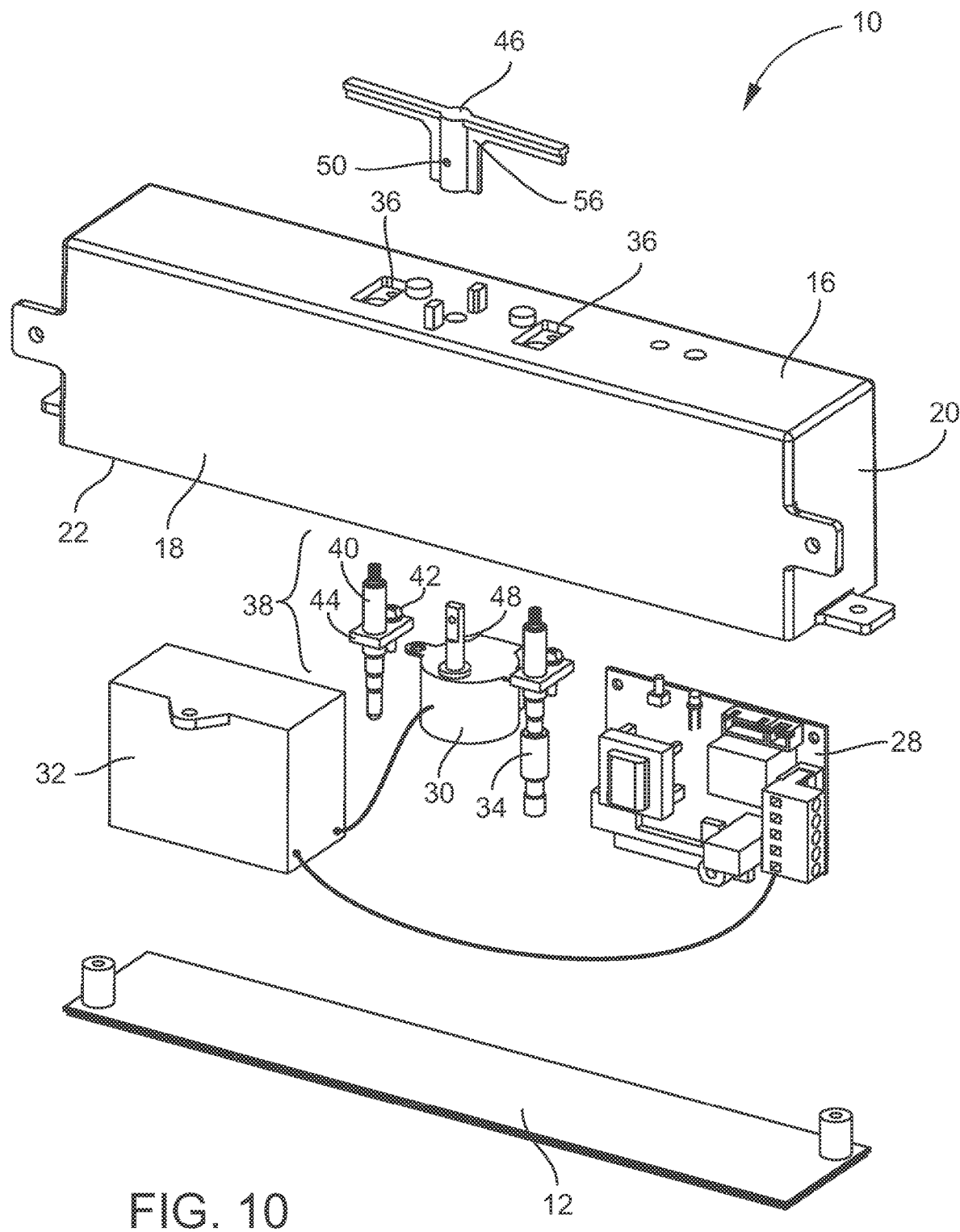
FIG. 10 is another exploded view of the self-cleaning ion generator device.
Figure 11:
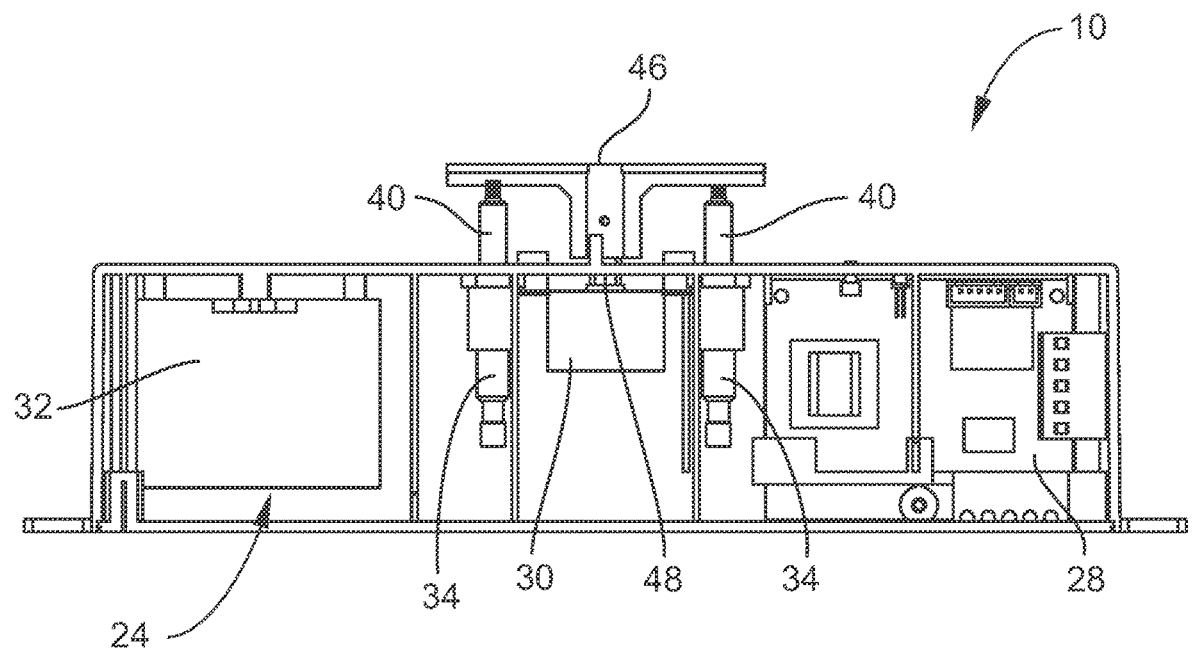
FIG. 11 is a front side cut-away view of the self-cleaning ion generator device.
Figure 12:
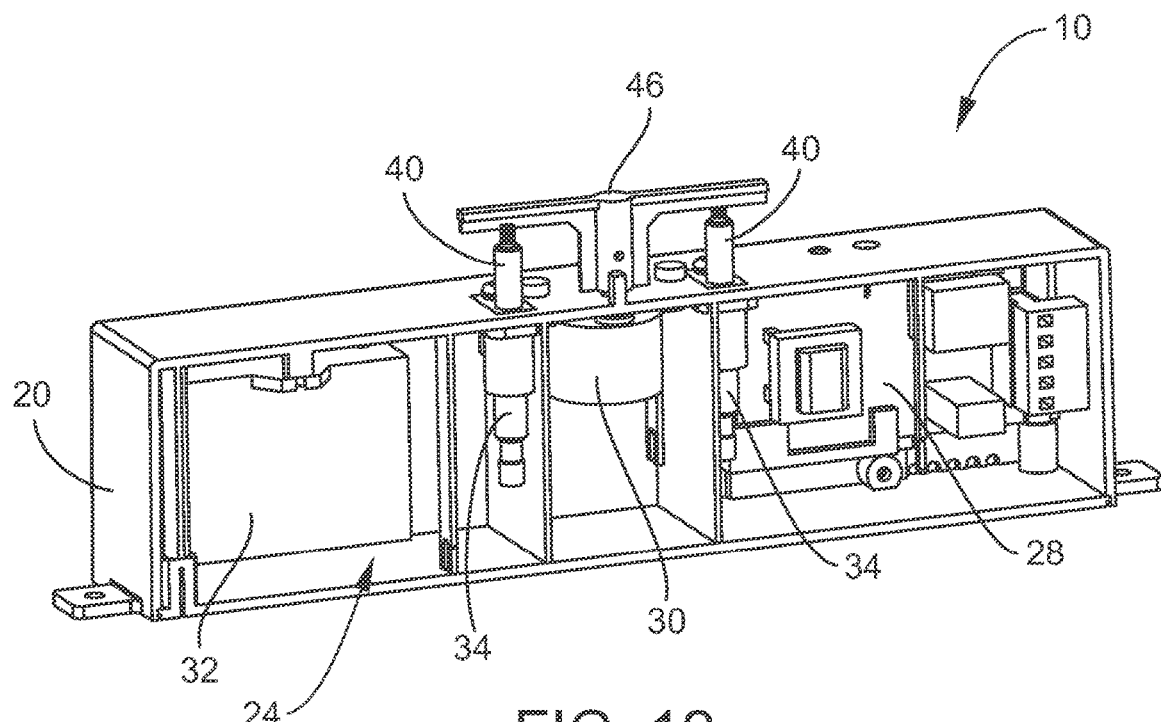
FIG. 12 is a front side perspective cut-away view of the self-cleaning ion generator device.
Figure 13:
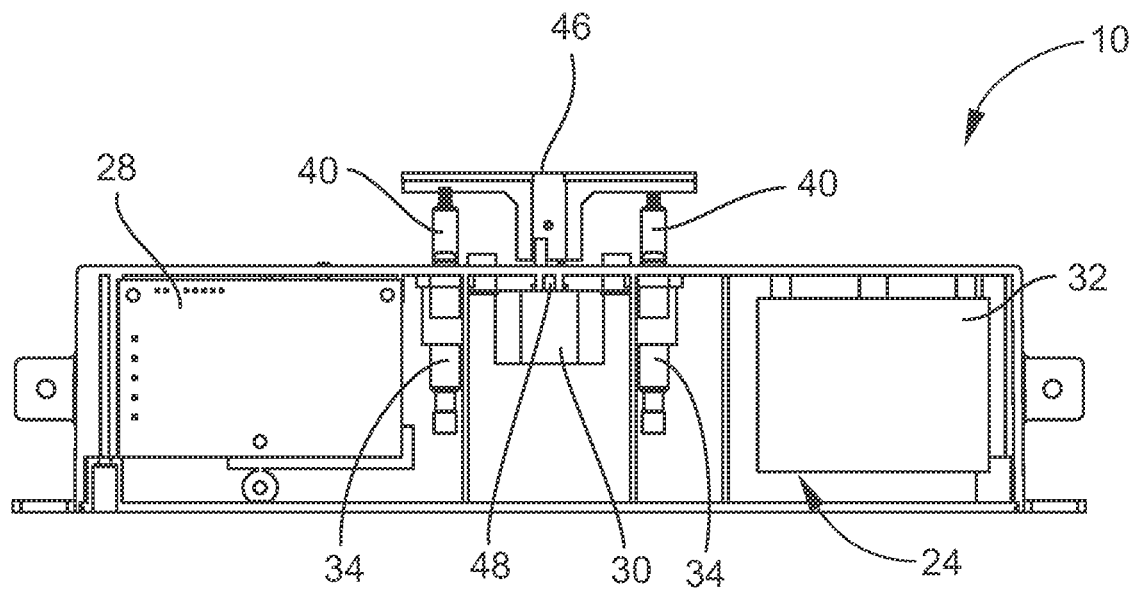
FIG. 13 is a backside cut-away view of the self-cleaning ion generator device.
Figure 14:
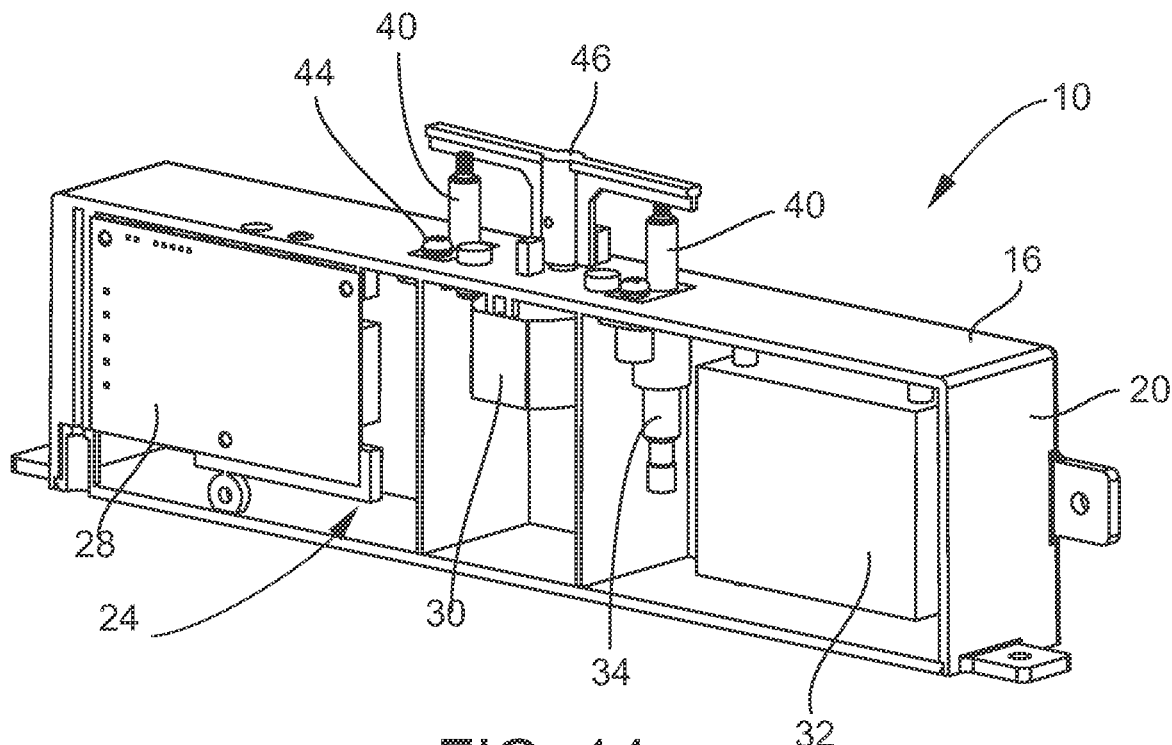
FIG. 14 is a backside perspective view cut-away view of the self-cleaning ion generator device.

The base portion 16 of the top portion 14 may contain at least one bore 36, and as illustrated in FIGS. 9 and 10, the base portion 16 of the top portion 14 may contain at least two bores 36. The bores 36 extend from the external side to the internal side of the base portion 16 and into the cavity 24. An ion terminal 38 extends through the at least one bore 36. In one embodiment, the ion terminal 38 may consist of a high voltage wire or electrode that extends through the bore 36. In another embodiment with a first bore 36 and a second bore 36, a first high voltage wire or electrode extends through the first bore 36 and a second high voltage wire or electrode extends through the second bore 36.

As illustrated, an ion terminal assembly 38 is disposed around and over the bore 36. The ion terminal assembly 38 is comprised of an ion terminal 40, an ion terminal securing device 42, and an attachment device 44. The ion terminal securing device 42 may be rectangular and having a first bore and a second bore extending from the top side to the bottom side of the ion terminal securing device 42. The first bore received the ion terminal 40, wherein a first portion of the ion terminal 40 extends above the top side of the ion terminal securing device 42 and a second portion extends below the bottom side of the ion terminal securing device 42. The attachment device 44 extends through the second bore for selectively securing the ion terminal assembly 38 to the base portion 16 of the top portion 14.

The ion terminal 40 may consist of a hollow column for providing support and protection to a high voltage wire. The hollow column may encircle high voltage wire. A first end of the high voltage wire may contain a brush that contains a plurality of bristles that extend outwardly away from the brush. The brush and its bristles may be made of any material that conducts electricity and the combination of the brush with its bristles and the high voltage wire or electrode may be collectively referred to herein as an electrode. In one embodiment, the bristles of the brush are composed of a thermoplastic polymer imbedded with conductive material that allows the polymer to conduct electricity. For example, the bristles of the brush may be composed of polypropylene or polyethylene and impregnated with carbon. Generally, the bristles of the brush may contain between about 20 to about 80 wt % polypropylene copolymer or polyethylene copolymer, between about 5 to about 40 wt % talc, and from about 5 to 40 wt % carbon black. However, any other resistive, inductive, reactive or conductive plastic or non-metallic material may be utilized for the bristles of the brush. The brushes are replaceable and allowed to be easily disengaged and new bristles may be inserted and retained.

In one embodiment, the brush is engaged to the end of the high voltage wire. The brush may be crimped to the end of the high voltage wires extending outwardly from the ion terminal 40. In another embodiment, the brush is engaged to the end of the high voltage wire by heat shrink. In an alternative embodiment, the ion terminal may consist of an electrode. The ion terminal 40 may deposit a stream of negative or positive ions into the surrounding air. When the device contains two or more ion terminals 40, each ion terminal 40 may deposit either negative or positive ions. As illustrated, the device 10 contains two ion terminals 40, wherein the first ion terminal 40 may emit negative ions and the second ion terminal 40 may emit positive ions. Alternatively, the first and second ion terminal 40 may both emit positive ions or both emit negative ions.

The area around the bore 36 on the top side of the base portion 16 of the top portion 14 may contain a depression that is identical to the shape of the ion terminal securing device 42, for allowing the ion terminal securing device 42 to be placed within the depression. The depression also contains a threaded bore that extends from the top side of the depression to the bottom side. The ion terminal securing device is selectively secured within the depression by the attachment device 44 that extends through the bore of the ion terminal securing device 42 and the threaded bore of the depression. Preferably the bore within the ion terminal securing device is internally threaded, along with the bore of the depression, for receiving the externally threaded attachment device 44, such as a screw, bolt, or the like.

The first portion of the ion terminal 40 extends upwards and above the top portion of the device 10. The second portion of the ion terminal 40 extends within the cavity 24 of the device 10 and engages a plug 34 in a selectively secured arrangement. The second portion preferably has a conductive element for contacting a similar conductive element within the plug 34 for creating an uninterrupted path for ions to flow from the plug to the ion terminal 40 and through the ion terminal 40 and exit out of the ion terminal 40 from the bristles of the brush. Alternatively, the ions exit from the point of an emitter or like arrangement. A selectively secured arrangement means the ion terminal 40 may be engaged and disengaged to the plug 34. This arrangement is beneficial, because the ion terminal 40 and the entire ion terminal assembly 38 is replaceable. Therefore, the ion terminal 40 may be disengaged from the plug 34 and a new ion terminal 34 may be engaged to the plug 34. The ion generator 32 is communicatively coupled to the plug 34 and provides ions that flow through the plug 34 and into the ion terminal 40. The plug 34 is disposed below the ion terminal 40 and within the cavity 24.

After the ion terminal 40 has been used for a predetermined period of time or when the ion terminal 40 suffers a reduction in effectiveness, the ion terminal assembly 38 may be removed from the top portion 14 and new ion terminal assembly 38 can be selectively secured to the top portion 14 with the second portion of the ion terminal 40 selectively secured to the plug 34.

The stepper motor 30 is positioned within the cavity 24, as shown in FIGS. 9-14. The stepper motor 30 is used to power a cleaning apparatus 46. The stepper motor 30 contains a terminal for receiving a power supply for providing power to the stepper motor 30. A rotational arm 48 extends generally outwardly from the stepper motor 30 and through a generally centrally located bore 50 that extends from the external side to the internal side of the top portion 14. The cleaning apparatus 46 is releasably engaged to the rotational arm 48 extending through the bore 50 of the top portion 14. As illustrated, the cleaning apparatus 46 is releasably engaged to the rotational arm 48 by a fastening device 52, such as a bolt. As illustrated in FIGS. 9 and 10, two bores 36 are disposed on the base portion 16 of the top portion 14 and positioned on opposite sides of the cleaning apparatus 46.

The cleaning apparatus 46 may be T-shaped, or in an alternative embodiment L-shaped. As illustrated in FIGS. 9-14, the T-shaped cleaning apparatus 46 has a horizontal portion and a vertical portion. The vertical portion contains a hollow shaft that is releasably engaged to the rotational arm 48. The horizontal portion extends outwardly from the vertical portion and optionally contains a cleaning head on each end of the vertical portions. The cleaning head 54 may contain any device that may clean the electrode or brushes of the ion terminal 40. As illustrated, the cleaning apparatus 46 includes a rib 56 that extends downward from the horizontal portion. The rib 56 has a width smaller than the width of the horizontal portion and extends downwardly from the horizontal portion and touches the ion terminal 40 and preferably the brushes of the ion terminal 40. As the cleaning apparatus 46 rotates, the rib 54 contacts the brushes on the ion terminal 40, wiping away and dust or particulate matter to clean the ion terminal 40.

The cleaning apparatus 46 is powered by the stepper motor 30 operationally connected to a timing circuit that activates the cleaning apparatus 46 at a predetermined interval. By way of example only, the cleaning apparatus 46 may be activated between every 12 to 24 hours. In one alternative embodiment, the cleaning apparatus may be "S" shaped or curved. In other words, when the cleaning apparatus 46 is viewed from above, the cleaning apparatus 46 has an "S" shaped or curved appearance, preventing both cleaning heads 54 from contacting the electrodes or brushes of the ion terminal 40 at the same time. While the cleaning apparatus 46 is activated, the device 10 ceases to produce ions, thus preventing any loose particles from sticking to the opposite polarity brush. The cleaning apparatus 46 may be straight, such as a bar or any other shape as desired by the user.

Figure 2:
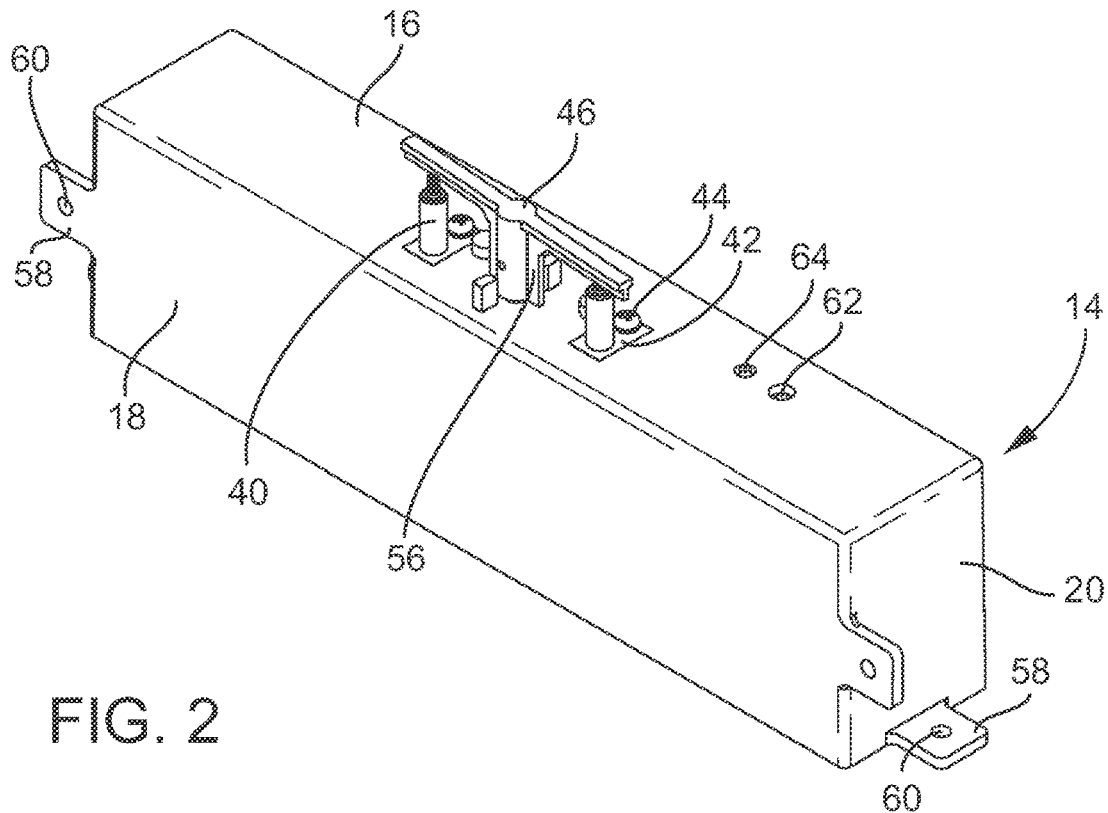
FIG. 2 is a top perspective view of the self-cleaning ion generator device.
Figure 6:
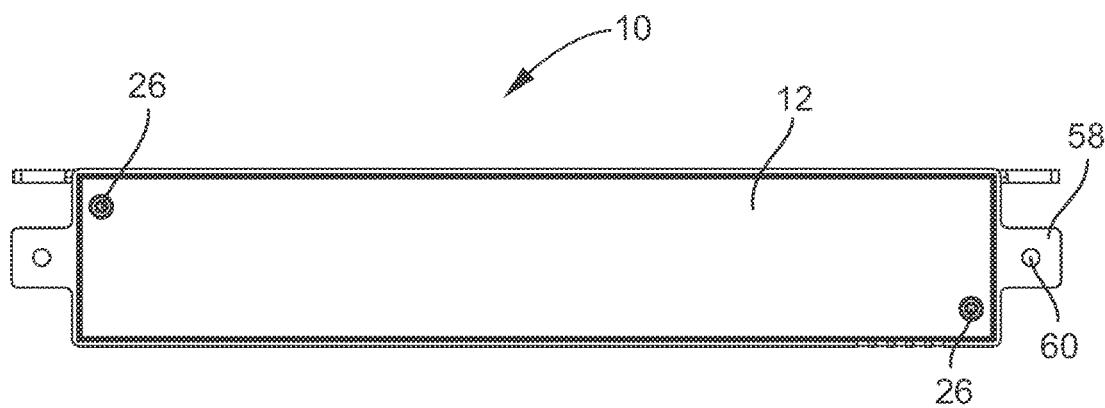
FIG. 6 is a bottom view of the self-cleaning ion generator device.
Figure 7:
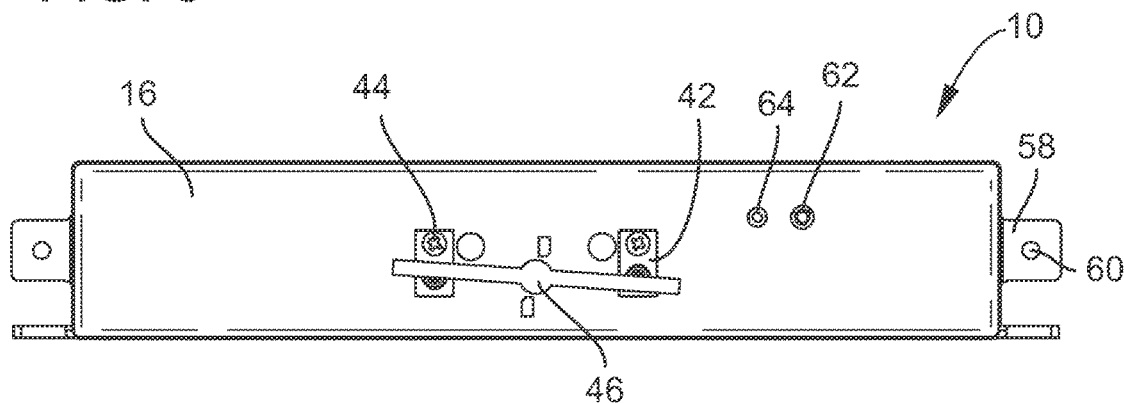
FIG. 7 is a top view of the self-cleaning ion generator device.
Figure 8:
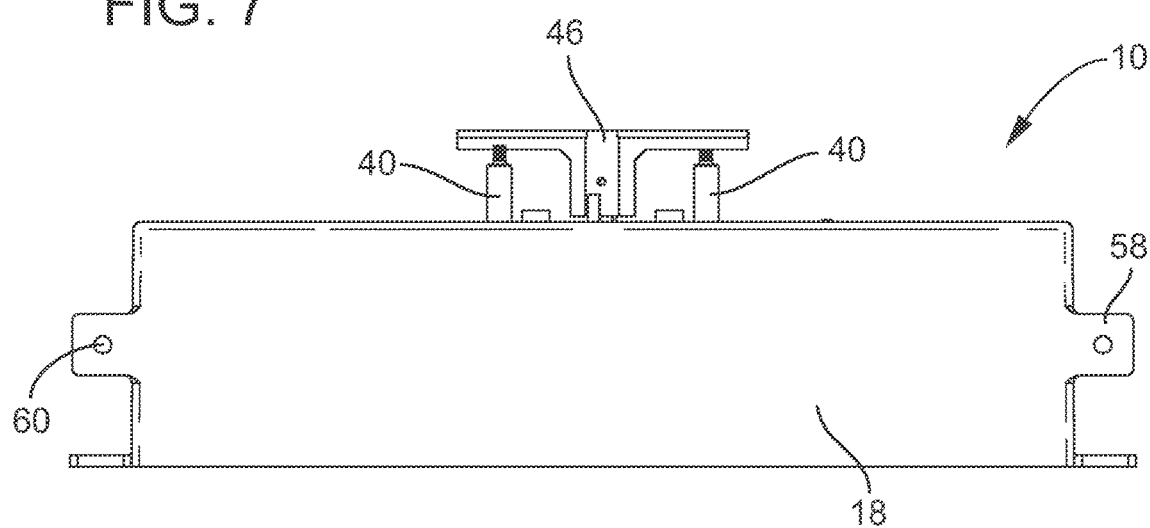
FIG. 8 is a side view of the self-cleaning ion generator device.

The device 10 may contain at least one retention flange 58. As illustrated in FIGS. 1 and 2, the device 10 may consist of at least one horizontal retention flange 58 and at least one vertical retention flange 58. The retention flange 58, as illustrated, is generally square or rectangular with a bore 60 extending from the first side to the second side of the retention flange 58 for receiving a fastening device (not shown) for engaging the device 10 to the duct. Fastening devices may include a screw, bolt, self-tapping sheet metal screws, spring loaded wing nuts with bolts, and the like. When mounted to a duct or other conduit, the top portion 14 extends within the duct or conduit with the ion terminal 40 extending within the duct and conduit, releasing ions with the duct or conduit. The bottom portion 12 is visible on the exterior of the duct. Preferably, the device 10 is mounted after a prefilter and before the cooling coil in an HVAC system. Alternatively, the device 10 may be mounted on any conduit with air flow, a supply air duct, or a return air duct.

The device 10 should be mounted so that air flows over the electrodes or brushes, such as air my flow through the goal posts on a football field.

The retention flange 58 may receive a magnet for attaching the device 10 to a metal object. The rectangular shape of the device 10 allows the device 10 to be mounted to the blower inlet of a fan housing and disperse ions throughout the blower inlet.

The device 10 may also include an alarm feature, including alarm contacts, that are communicatively coupled to a building management system that sends a signal to the building management system if ions are not produced by the device 10. The building management system then sends an alert informing a user that the device 10 is not producing ions. A test button 64 may also be located on the device 10 to check the motor status during preventive maintenance and a light 62, preferably a light emitting diode (LED) light, may be illuminated, indicating a cleaning test is being conducted. The light 62, such as an LED light, may be positioned on the bottom portion 12 that is illuminated and indicating power is being supplied to the device 10.

The device 10 may produce approximately equal amounts of positive and negative ions, regardless of airflow velocity or other conditions such as humidity or temperature. In example forms, the device 10 produces positive ions and negative ions in a concentration of at least about $10^9$ ions/second, and operates on 24 VAC, 110 VAC or 200 VAC to 240 VAC without the use of an external transformer. In alternate embodiments, the device generates negative ions only, or positive ions only, or generate negative ions and positive ions in unequal quantities. The device 10 optionally utilizes nano-electronic components allowing the device to be very compact, requiring less than 1 watt/ion generator module, for example less than 0.5 watts/ion module, and in further examples less than 0.36 watts per ion module. The bottom portion 12 may contain terminals extending therefrom for connecting the 24 VAC, 110-240 VAC, and neutral input.

The device 10 may be positioned and secured in place within a conduit or the housing of the air handler unit, such as a duct, such that the electrodes $40^+$ and $40^-$ are aligned generally perpendicularly to the direction of the airflow across the device 10, to prevent recombination of the positively charged ions with the negatively charged ions.

The treatment of air by delivery of bipolar ionization to an airflow within a conduit according to the systems and methods of the present invention may be utilized for various purposes. For example, application of bipolar ionization to an airflow within an HVAC conduit such as an air handler housing or duct may be utilized to abate allergens, pathogens, odors, gases, volatile organic compounds, bacteria, virus, mold, dander, fungus, dust mites, animal and smoke odors, and/or static electricity in a treated air space to which the airflow is directed. Ionization of air in living and working spaces may reduce building related illness and improve indoor air quality; and additionally, can reduce the quantity of outside air needed to be mixed with the treated indoor air, reducing heating and cooling costs by enabling a greater degree of air recirculation.

During use, once power is provided to the device 10, the device 10 initiates an internal check on all systems. After initializing and the check has confirmed all systems are operational, the light 62 will blink "on" and include a visible meter of how many days the device 10 has been powered. After each day of being powered, the display will add a number to the display indicating the number of days the device 10 has been powered. The device 10 can also include a button 64 that when depressed, initiates a cleaning cycle of the device 10, causing the cleaning apparatus 46 to rotate and cleaning the ion terminals 40 or the brushes on the ion terminals 40.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A self-cleaning ion generator device, comprising:
   a rectangular housing defining a volume therein;
   at least one bore disposed within the housing;
   at least one ion terminal assembly; and
   a cleaning apparatus.

2. The self-cleaning ion generator device of claim 1, wherein the cleaning apparatus contains a rib.

3. The self-cleaning ion generator device of claim 1, further comprising two bores disposed within the housing.

4. The self-cleaning ion generator device of claim 1, further comprising two ion terminal assemblies.

5. The self-cleaning ion generator device of claim 1, wherein the cleaning apparatus is a t-shaped element including a horizontal portion and a vertical portion containing a hollow shaft.

6. The self-cleaning ion generator device of claim 1, wherein the self-cleaning ion generator device is configured to initiate an internal check for determining that various components of the self-cleaning ion generator device are operational.

7. The self-cleaning ion generator device of claim 1, wherein the ion terminal assembly includes an ion terminal, an ion terminal securing device, and an attachment device.

8. The self-cleaning ion generator device of claim 1, wherein the ion terminal assembly is selectively secured to the housing.

9. The self-cleaning ion generator device of claim 1, wherein the cleaning apparatus has a horizontal portion and/or a vertical portion.

10. A self-cleaning ion generator device of claim 1, further comprising a motor positioned within the housing and engaged to the cleaning apparatus.

11. A self-cleaning ion generator device, comprising:
    a rectangular housing defining a volume therein;
    two bores disposed within the housing;
    two ion terminal assemblies; and
    a cleaning apparatus.

12. A self-cleaning ion generator device according to claim 11, wherein the cleaning apparatus contains a rib.

13. A self-cleaning ion generator device according to claim 11, further comprising at least one retention flange.

14. A self-cleaning ion generator device according to claim 11, wherein the cleaning apparatus is a t-shaped element including a horizontal portion and a vertical portion containing a hollow shaft.

15. A self-cleaning ion generator device, comprising:
    a rectangular housing defining a volume therein;
    two bores disposed within the housing;
    two ion terminal assemblies that include an ion terminal, an ion terminal securing device, and an attachment device; and
    a cleaning apparatus.

16. The self-cleaning ion generator device of claim 15, wherein the self-cleaning apparatus contains a rib.

17. The self-cleaning ion generator device of claim 15, further comprising at least one retention flange.

18. The self-cleaning ion generator device of claim 17, wherein the cleaning apparatus is a t-shaped element including a horizontal portion and a vertical portion containing a hollow shaft.

19. The self-cleaning ion generator device of claim 15, wherein the self-cleaning ion generator device is configured to initiate an internal check for determining that various components of the self-cleaning ion generator device are operational.

20. The self-cleaning ion generator device of claim 15, wherein the ion terminal consists of a hollow column encircling a high voltage wire.

\* \* \* \* \*